(12) United States Patent
Ramirez et al.

(10) Patent No.: US 7,025,416 B1
(45) Date of Patent: Apr. 11, 2006

(54) RESIN CHAIR WITH REMOVABLE DESK TOP

(76) Inventors: Oriel Ramirez, 7040 W. Palmetto Rd. 4-634, Boca Raton, FL (US) 33433; Jose M Rives, 7040 W. Palmetto Rd. 4-634, Boca Raton, FL (US) 33433

( * ) Notice: Subject to any disclaimer, the term of this patent is extended or adjusted under 35 U.S.C. 154(b) by 0 days.

(21) Appl. No.: 11/005,434

(22) Filed: Dec. 6, 2004

(51) Int. Cl.
*A47B 39/00* (2006.01)

(52) U.S. Cl. ............... 297/160; 297/161; 297/171; 297/411.27; 403/329; 403/361

(58) Field of Classification Search ............... 297/135, 297/160, 161, 162, 170–172, 144, 145, 153, 297/411.24, 411.27, 446.24; 108/147.21; 403/326, 329, 361
See application file for complete search history.

(56) References Cited

U.S. PATENT DOCUMENTS

| | | | |
|---|---|---|---|
| 88,255 A | 3/1869 | Zimmerman | |
| 175,176 A | 3/1876 | Sheldon | |
| 1,217,783 A | 2/1917 | Langslow | |
| 1,324,503 A | 12/1919 | Hirsch | |
| 2,165,125 A | 7/1939 | Bargen | |
| 2,184,173 A | 12/1939 | Bargen | |
| 2,258,532 A | 10/1941 | Bargen | |
| 2,319,202 A | 5/1943 | Bargen | |
| 2,669,285 A * | 2/1954 | Young | 182/33 |
| 2,741,299 A * | 4/1956 | Bargen | 248/407 |
| 2,764,229 A | 9/1956 | Bargen | |
| 3,006,687 A * | 10/1961 | Brandon | 297/153 |
| 3,367,713 A * | 2/1968 | Krueger | 297/162 |
| 4,455,008 A | 6/1984 | MacKew | |
| 5,503,457 A * | 4/1996 | Rosado | 297/448.1 |
| 5,516,190 A * | 5/1996 | Kain et al. | 297/183.6 |
| 5,573,301 A | 11/1996 | Scott | |
| 5,649,737 A * | 7/1997 | Behnke | 297/170 |
| 6,292,979 B1 * | 9/2001 | Kuo | 16/113.1 |
| 6,412,862 B1 | 7/2002 | Dickerson et al. | |
| 6,481,790 B1 * | 11/2002 | Cheng | 297/153 |
| 6,854,919 B1 * | 2/2005 | Neumann et al. | 403/326 |

FOREIGN PATENT DOCUMENTS

| | | |
|---|---|---|
| GB | 724.315 | 2/1955 |
| GB | 2.327.600 | 2/1999 |

* cited by examiner

*Primary Examiner*—Laurie K. Cranmer
(74) *Attorney, Agent, or Firm*—Michael I Kroll

(57) ABSTRACT

A chair having a pair of channels for receiving the posts of an independent, removable desktop. A locking mechanism is provided to secure one of the desk posts within its receiver channel. The locking mechanism may be easily released to extract the desk post from the receiver to remove the desktop when it is not needed.

8 Claims, 12 Drawing Sheets

RESIN CHAIR WITH REMOVABLE DESK TOP

BACKGROUND OF THE INVENTION

1. Field of the Invention

The present invention relates generally to chair and desk combination units and, more specifically, to a chair/desk combination comprising a chair having means for receiving the posts of an independent, removable desktop. A locking means is provided to secure the desk post within the receiver. The locking means may be easily released to extract the desk post from the receiver to remove the desktop when it is not needed.

2. Description of the Prior Art

There are other desk attachments designed for chairs. Typical of these is U.S. Pat. No. 88,255 issued to W. Zimmerman on Mar. 23, 1869.

A patent was issued to C. B. Sheldon on Mar. 21, 1876 as U.S. Pat. No. 175,176. U.S. Pat. No. 1,217,783 was issued to H. R. Langslow on Feb. 27, 1917 and a patent was issued on Dec. 9, 1919 to P. W. Hirsch as U.S. Pat. No. 1,324,503.

W. J. Bargen was issued a patent on Jul. 4, 1939 as U.S. Pat. No. 2,165,125 and U.S. Pat. No. 2,184,173 was issued to W. J. Bargen on Dec. 9, 1939. Another patent was issued to W. J. Bargen as U.S. Pat. No. 2,258,532 on Oct. 7, 1941. A patent was issued on May 18, 1943 to W. J. Bargen as U.S. Pat. No. 2,319,202.

Another patent was issued to Bargen on Sep. 25, 1956 as U.S. Pat. No. 2,764,229. U.S. Pat. No. 4,455,008 was issued to J. McCaw on Jun. 19, 1984. On Nov. 12, 1996 a patent was issued to D. G. Scott as U.S. Pat. No. 5,573,301. R. W. Dickerson et al. was issued on Jul. 2, 2002 to as U.S. Pat. No. 6,412,862.

A British patent was issued to K. J. Morrison on Feb. 16, 1955 as U.K. Patent No. 724,315. Another was issued on Feb. 2, 2004 to G. B. Babaloa as U.K. Patent No. GB 2 327 600 A.

The construction and arrangement of the standard B, the clamp K, the table A, the metal plate E, the hinged fork brace C, combined to operate substantially as set forth.

The clamp A, consisting of the exteriorly screw-threaded tube a, having a rigid jaw c, made in one piece therewith, in combination with the adjustable interiorly screw-threaded jaw c, and the binding screw d, as and for the purpose described.

The clamp A, consisting of the exteriorly screw-threaded tube a, and adjustable jaw c, with binding-screw B, having annular groove g, the adjustable bracket C, and the socket D, substantially as and for the purpose described.

The combination with the frame of a chair, of a sheet metal socket embodying a pair of tapered recesses, a removable desk portion including a pair of tapered hollow ribs having engagement with the aforesaid recesses and formed by bending a piece of sheet metal upon itself at the edges.

A device of the class described comprising the combination of a supporting bracket, adapted to be secured to the side of a chair: an arm, slidable on said bracket, said arm having, on its lower surface, a pair of parallel tracks curved around a center disposed above the seat of the chair, said tracks being substantially parallel to the outer edge of said arm; and guide members, carried by said bracket and cooperating with said tracks to limit the movement of the arm to a path predetermined by the curvature of the tracks.

In an article of furniture for the purpose se forth, a one-piece flat body formed of an enlarged part and a reduced part extended rearwardly from the latter, said enlarged part providing a desk and said reduced part constituting an arm rest, an angle bar anchored to the lower face of the desk and including a vertical flange, an upwardly and downwardly movable combined adusting and supporting means for the desk including a head part being secured to the lower face of the desk at right angles to and formed with a gullet for the passage of said bar, said head provided with a pair of oppositely extending arms secured to said vertical flange, and a stationary combined carrying, receiving and supporting structure for said means including a forwardly inclined channel-shaped portion in wheich said shank is slidably mounted, and a clamping device having a part mounted in said shank and a plurality of elements carried by said portion and coacting with said part for clamping the shank stationary to the said portion.

In a structure for coupling an upper element to a lower element and for supporting the upper element in spaced forwardly extending relation with respect to the lower element, said structure including a member formed of an upstanding arm and a horizontally disposed lower arm extending inwardly at right angles from the lower end of the upstanding arm and a horizontally disposed lower arm extending inwardly at right angles from the lower end of the upstanding arm, the latter being formed intermediate its ends with an inclined part, an upper connection means adapted to be anchored to the lower face of the said upper element, said upstanding arm having an upper straight portion extended into and being secured to said means, said lower arm being formed at a horizontal and a vertical flange, and a lower connection means adapted to be anchored against the lower face of the vertical flange, and a lower connection means adapted to be anchored against the lower face of the lower element and bearing against the lower face of the horizontal flange and inner face of the vertical flange.

In a desk including a seat and a top, means supporting said top relative to the seat comprising an inner and outer tubular member disposed in telescopic relation, said outer member being stationary, said inner member being lengthwise shiftable relative to the outer member, means for securing the lower end of the outer member, means for securing the lower end of the outer member of said seat, means for securing the upper end of the inner member to one side of said said top, interengageabele teeth within said supporting means being arranged on opposed faces of said members for sustaining the inner member in adjusted position, said inner member being slotted, and clamping means including parts arranged in said inner member and slot and parts arranged in said outer member and threadedably engaging with the said other parts for clamping other opposed faces of said members together for securing said inner member in adjusted position relative to said outer member.

In a school desk including a pedestal base having a U-shaped upper portion, a combined seat and back, a combined supporting plate for supporting and attaching the combined seat and back to the upper portion of the base, said plate including a U-shaped member having the parallel legs thereof longer than the legs of said upper pedestal portion, a pair of eats extending from the right portion of said plate to said upper pedestal portion, and means securing said combined seat and back to said ears and the end portions of the legs of said plate.

A combination seat support and desk bracket comprising a seat support member, a base engaging member formed integrally sith said seat support member and extending substantially perpendicularly thereto, said base engaging member having a substantially C-shaped cross-section, an arm extending laterally of said seat support member and an upstanding desk bracket formed integrally with said arm and extending oppositely of said base engaging member.

A modular arrangement for supporting any one of a wide variety of sizes of reading and other materials at a freely selectable location in relation to any selected one of a wide variety of local environments, such as chairs, sofas, tables and the like is disclosed and includes an expansible reading material holding assembly along with a plurality of support mechanisms each accepted for attachment to a different class of local environment and an arrangement for coupling the holding assembly to a select one of the support mechanisms to provide limited manual adjustability of the elevation of the holding assembly relative to the selected support mechanism as well as a limited amount of manual adjustability of the holding assembly, from vertical to horizontal, as may be preferenced by the various users. In the horizontal attitude the holding assembly functions as a table. The coupling means may include an articulated arm comprising a pair of arm members journaled together at respective first ends for unrestricted angular movement in a generally horizontal plane with one of the arms having its second end pivotably attached to the support mechanism and the other of the arms having its second end pivotably supporting the material holding assembly. The material holding assembly may include lateral extension portions and telescopic risers movable in generally orthogonal directions to expand and contract the reading material support area.

The present device is an improved table for attachment to the frame of a chair. The improved table comprises, in general, a table top including a first table top half and a second table top half; cooperative holding devices for holding the table halves together to establish a unitary condition of the table top; a first crank for rotatably supporting the first table top half for rotation about a first substantially vertical axis; a first mounting tube for rotatably supporting the first crank for rotation about a second substantially vertical axis offset from the first vertical axis, a first bracket for attaching the first mounting tube to the frame of the chair; a second crank for rotatably supporting the second table top half for rotation about a third substantially vertical axis; a second mounting tube for rotatably supporting the second crank for rotation about a fourth substantially vertical axis offset horizontally from the third vertical axis, and a second bracket for attaching the second mounting tube to the frame of the chair. The dimensions of the components of the table and the distances between certain pivot axes can be selected so that parallel movement of the table top can be accomplished. However, if the dimensions of the chair are such that will not permit the above mentioned dimensions to be selected, under certain conditions the table top may be moved from a forward most position to a rearward most parallel position by skewing the table top as it is moved.

An assembly for mounting a table, tray or other removable component to a chair to support a laptop computer or other appliance includes a socket that can be permanently mounted in the chair arm and a bracket or mounting assembly that can be mounted on the bottom of the removable component. The socket includes a sleeve with a collar mounted on the top of the sleeve. The collar surrounds the area around a hole in the chair arm through which the socket sleeve extends. The sleeve is attached to an internal frame member. A spring biased plug shifts within a cavity in the sleeve. A rigid pin located on the bottom of the removable component is inserted through a central opening in the collar into the cavity, forcing the plug into the sleeve. The table is firmly supported by the socket, but it is free to rotate in a horizontal plane.

A tray 5 is supported on a chair arm, bed-rail or other support by a pair of adjustable bent arms 1 and has one or a pair of detachable telescopic legs 6 mounted in rear sockets 4. One or more straps 11 with weighted ends may assist retention or can be used to hold a book on the tray.

A device for supporting a book comprises a book support in the form of a board 2 with a shelf 4 and a clip 3, a mounting plate 5 and an extensible arm 6. The extensible arm is hinged to the book support by a bushing which enables the book support to be adjusted to the convenience of the user. When in use the plate 5 may be mounted on a wall beside a bed or chair and an open book can be placed on the board with the bottom of the book resting on the shelf and the top of the book held in clip 3. The device may also be used for writing as well as reading. It can be folded away when unused by contracting the arm 6.

While these chair/desk combinations may be suitable for the purposes for which they were designed, they would not be as suitable for the purposes of the present invention, as hereinafter described.

SUMMARY OF THE PRESENT INVENTION

A primary object of the present invention is to provide a chair/desk combination wherein the desktop may be selectively installed and removed as needed.

Another object of the present invention is to provide a chair/desk combination wherein said desk includes a plurality of posts extending from a bottom portion thereof that are inserted into corresponding desktop post receivers disposed in said chair.

Yet another object of the present invention is to provide a chair/desk combination wherein one said post and its corresponding post receiver include a locking means for securing said desktop to said chair.

Still yet another object of the present invention is to provide a chair/desk combination wherein said locking means may be easily released by the user for extracting and removing said desktop from said chair when desired.

Another object of the present invention is to provide a chair/desk combination that is simple and easy to use.

Yet another object of the present invention is to provide a chair/desk combination that is inexpensive to manufacture and operate.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
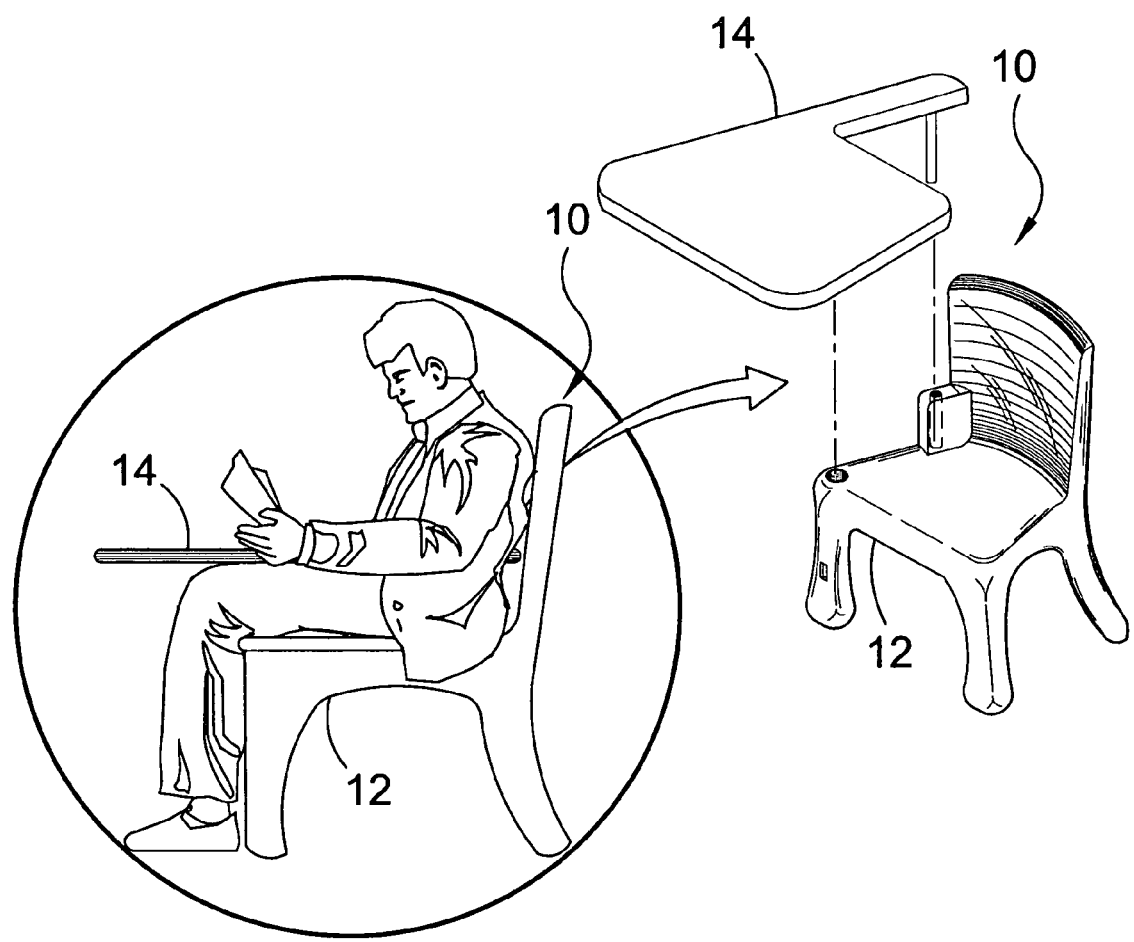
FIG. 1 is an illustrative view of the present invention in use.

Turning now descriptively to the drawings, in which similar reference characters denote similar elements throughout the several views, the figures illustrate the Combination Chair and Desk of the present invention. With regard to the reference numerals used, the following numbering is used throughout the various drawing figures.

10 Combination Chair and Desk
12 chair
14 desktop
16 first receiver recess
18 second receiver recess
20 first post member
22 second post member
23 locking means
24 locking tab
26 locking recess
27 user
28 desk support

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a combination desktop 14 and chair 12 wherein the chair 12 that has a removable desktop 14 that can easily and quickly be installed and removed as needed.

Figure 2:
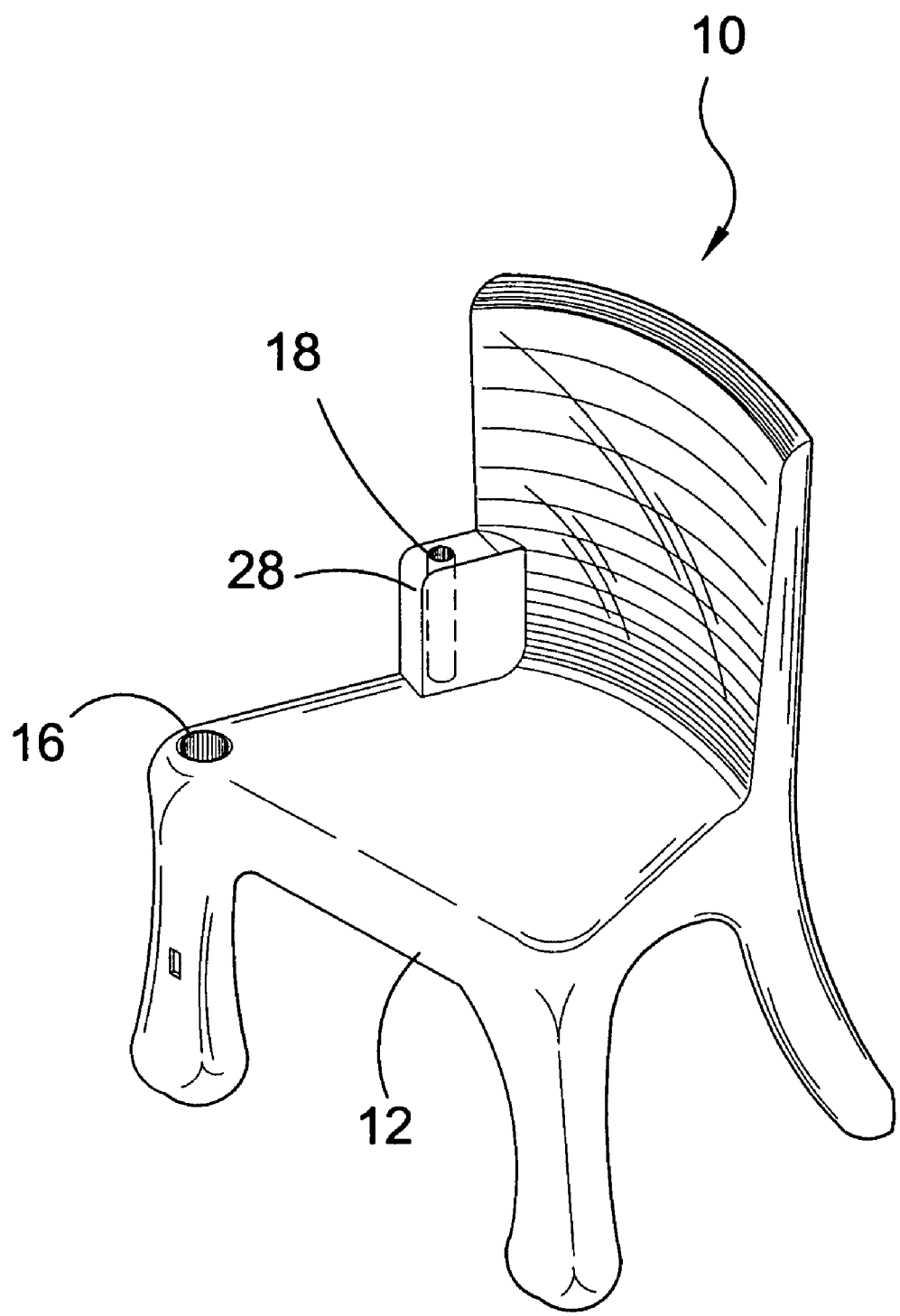
FIG. 2 is a perspective view of the present invention.

FIG. 2 is a perspective view of the present invention 10. Shown is a perspective view of the present invention 10, a plastic resin combination of a chair 12 with a removable desktop wherein the chair 12 contains a first receiving recess 16 and a second receiving recess 18 for retaining said desktop therein. The second receiving recess 18 is disposed within a desk support 28.

Figure 3:
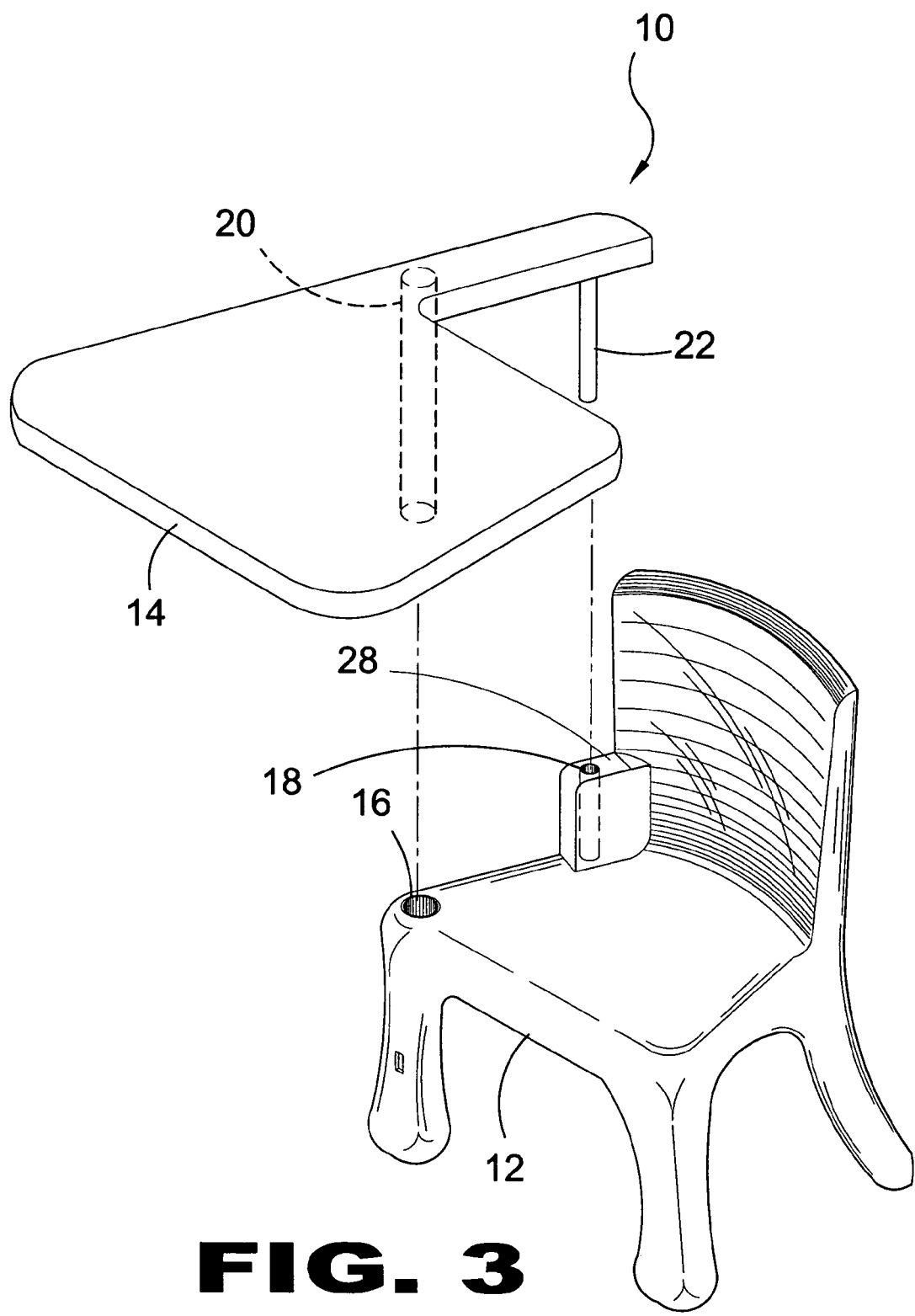
FIG. 3 is an exploded perspective view of the present invention.

FIG. 3 is an exploded perspective view of the present invention 10. Shown is a perspective view of the present invention 10, a plastic resin combination of a desktop 14 and chair 12 wherein said chair 12 contains a first receiving recess 16 and a second receiving recess 18 for retaining said desktop 14 therein. The second receiving recess 18 is disposed within a desk support 28 on which the desktop 14 resides upon when installed. Extending vertically downward from the bottom of the desktop 14 are a first post member 20 and a second post member 22 that are inserted into the first receiving recess 16 and the second receiving recess 18 accordingly during installation.

Figure 4:
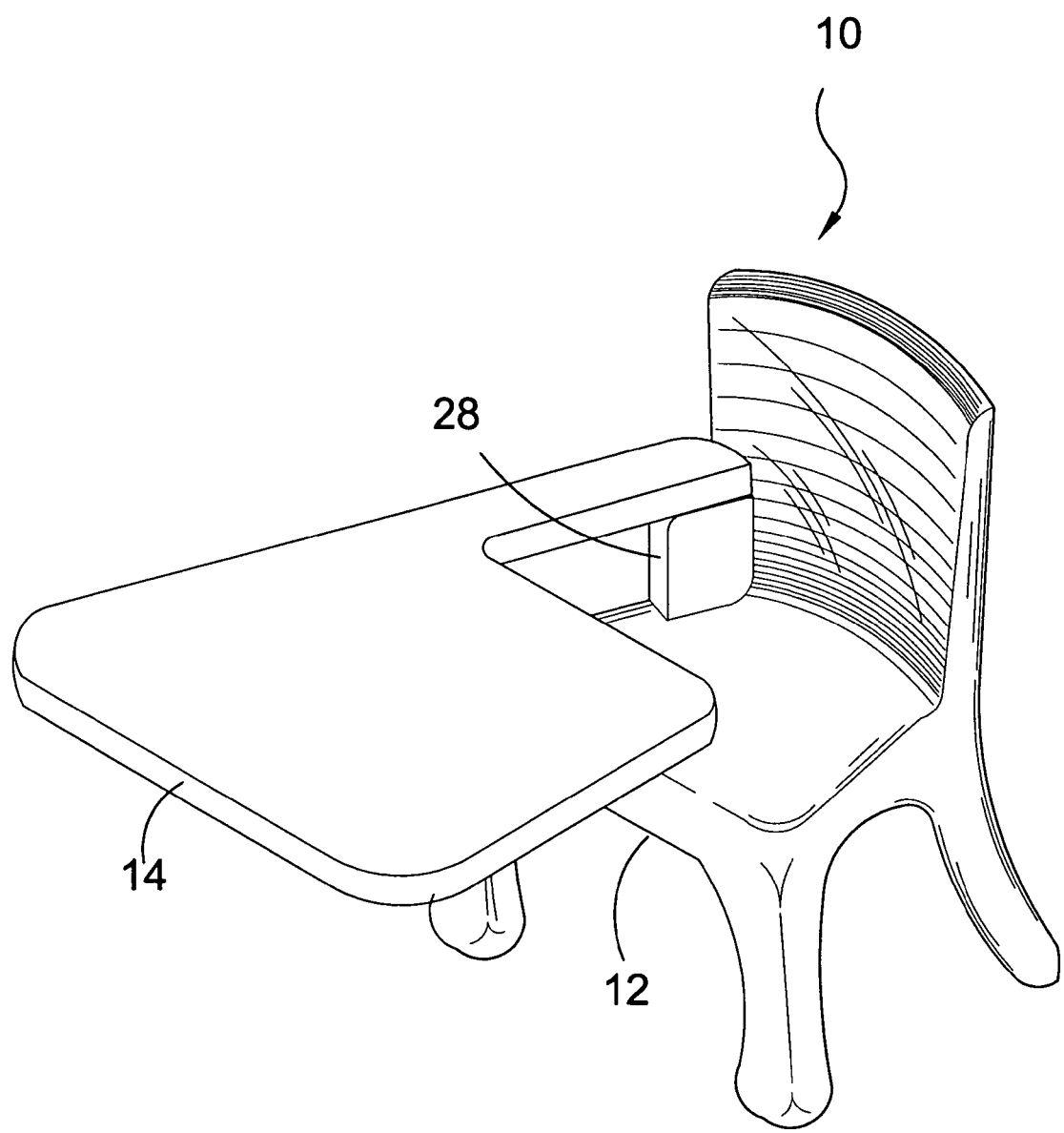
FIG. 4 is a perspective view of the present invention fully assembled.

FIG. 4 is a perspective view of the present invention 10 fully assembled. The desktop 14 is installed on the chair 12 with a portion of the bottom of the desktop 14 seated on the desk support 28.

Figure 5:
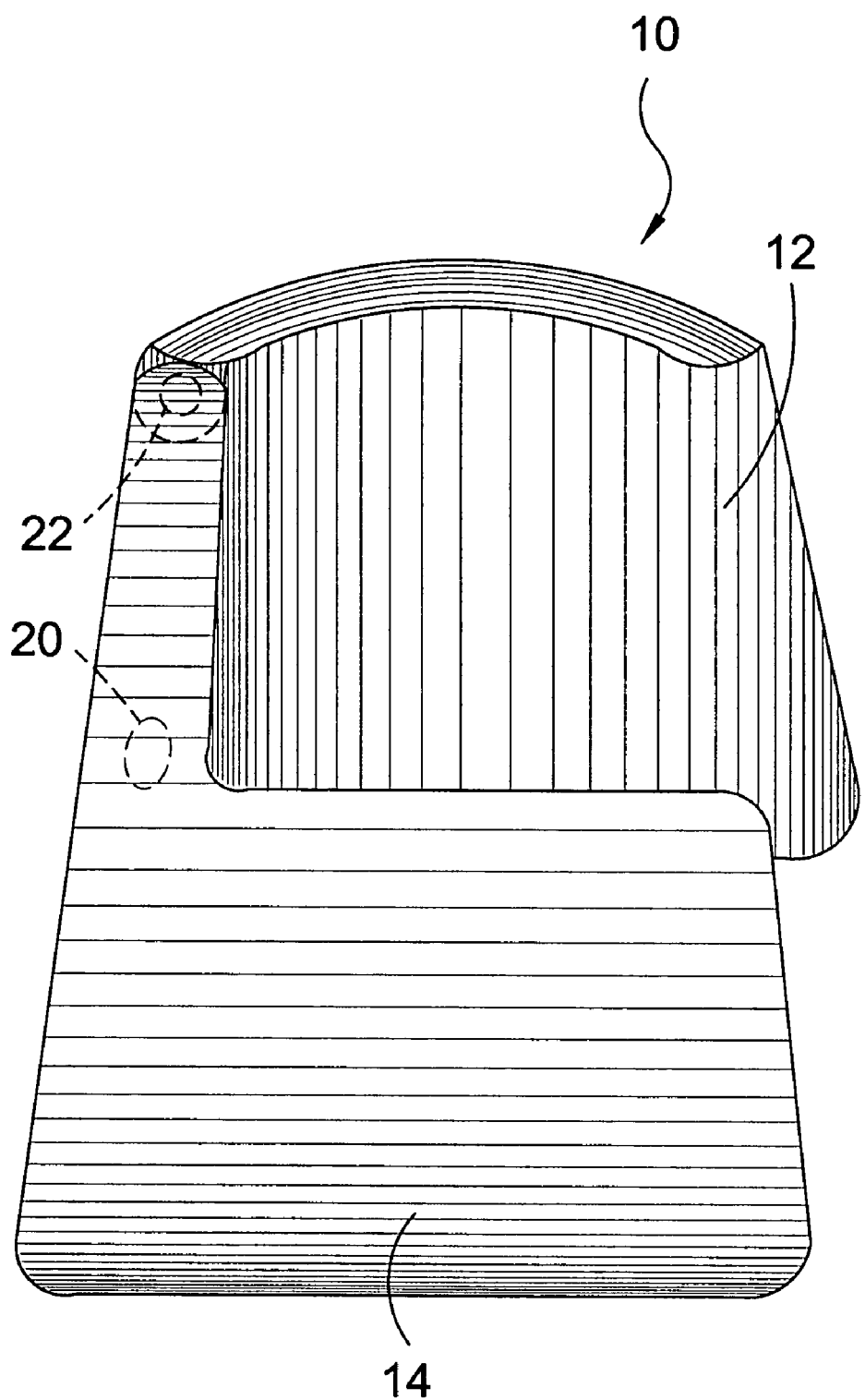
FIG. 5 is a top view of the present invention fully assembled.

FIG. 5 is a top view of the present invention fully assembled. The desktop 14 is installed on the chair 12 with a portion of the bottom of the desktop 14 seated on the desk support 28. The first post member 20 and second post member 22 are depicted in hidden line.

Figure 6:
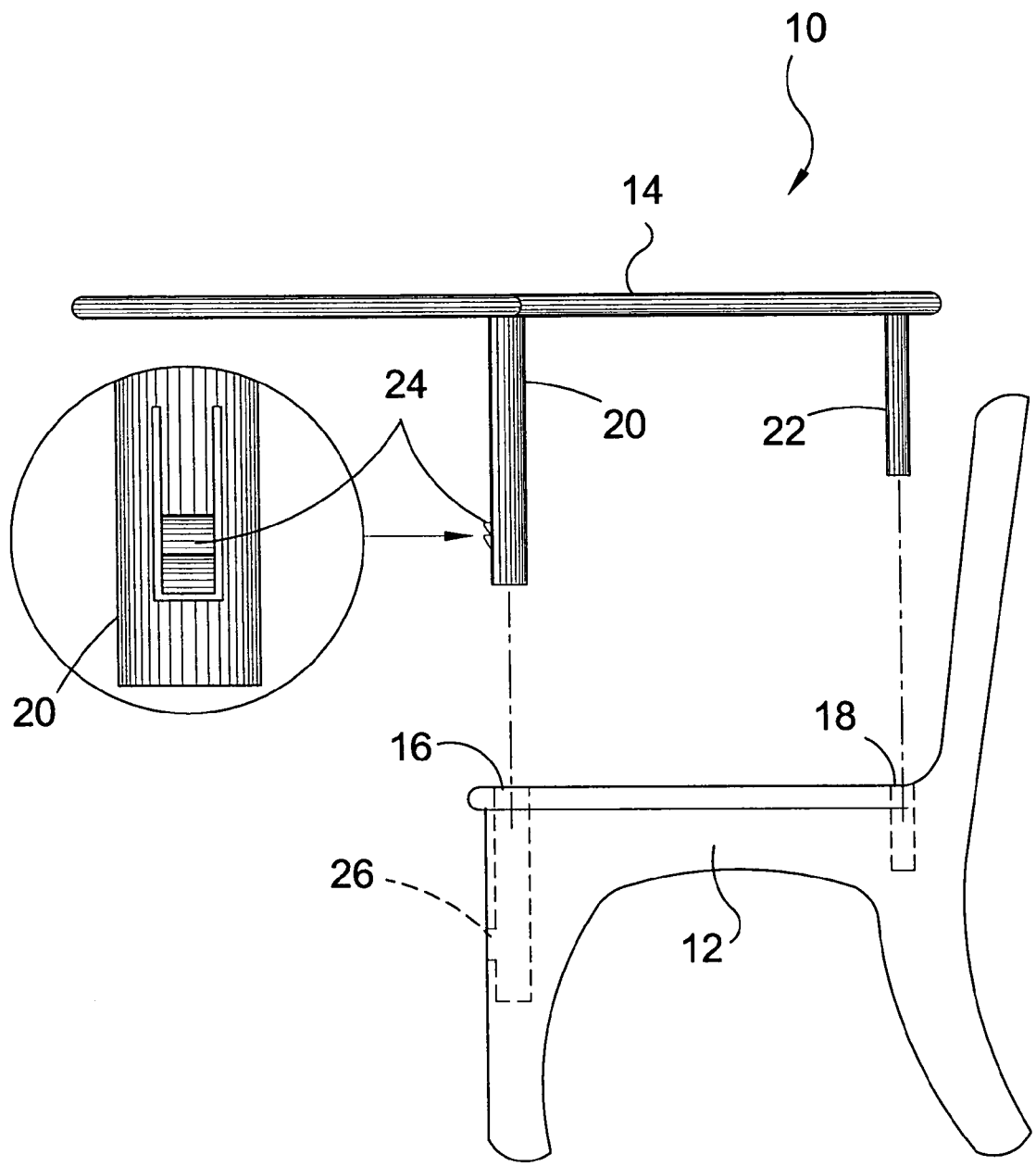
FIG. 6 is an exploded side view of the present invention.

FIG. 6 is an exploded side view of the present invention 10. Shown is a detailed view of the locking tab 24, which is a peninsula-type cutout, forming a resilient appendage with teeth extending outwardly therefrom. The locking tab 24 retracts as the first post member 20 is inserted into the first receiver recess 18 and snaps into place once aligned with the locking recess 26 where it is retained due to the structure of the flat top thereby securing the desk top to the chair until the locking tab 24 is depressed simultaneously as the desktop 14 is lifted. The shape and configuration may be changed without deviating from the objectives and operation mentioned above.

Figure 7:
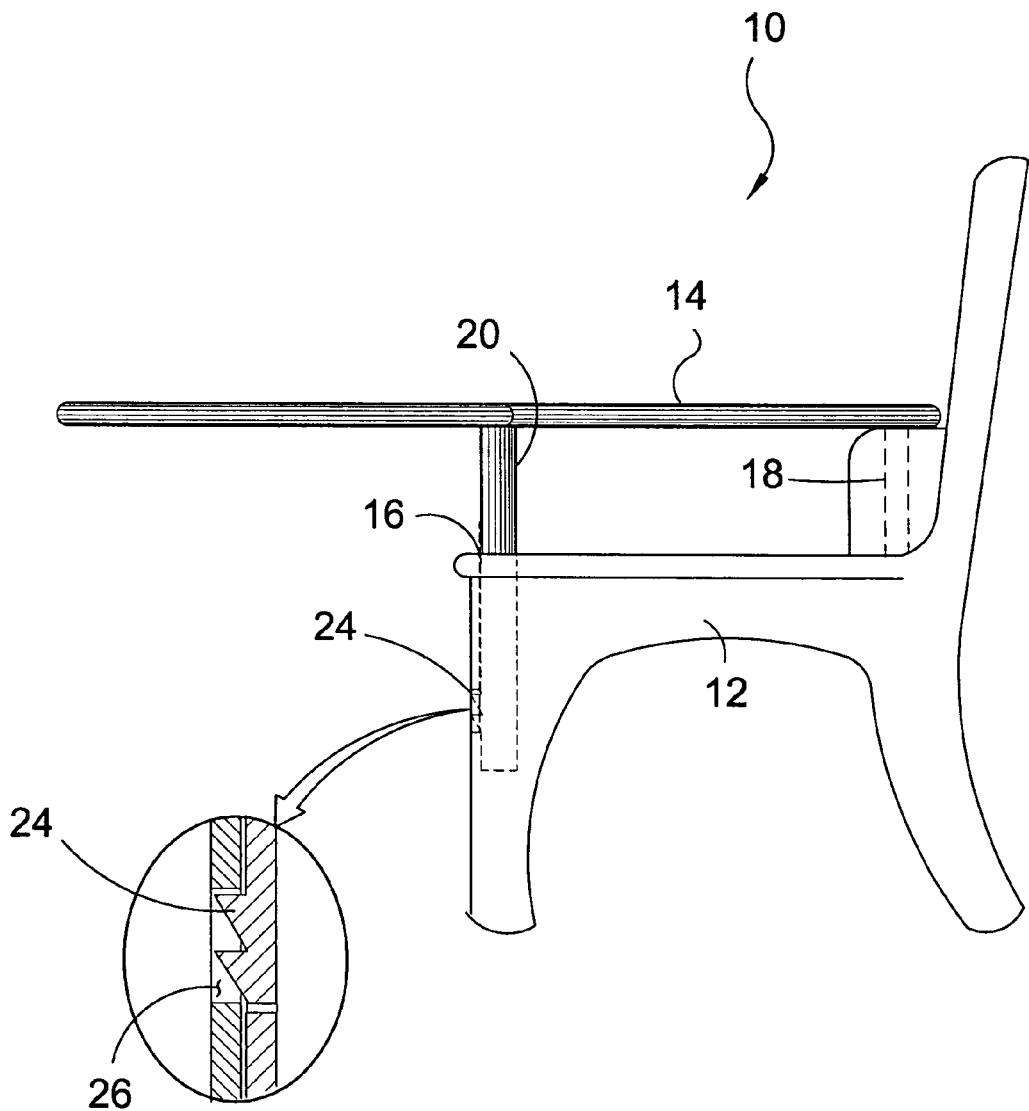
FIG. 7 is an exploded side view of the present invention.

FIG. 7 is an exploded side view of the present invention 10. Shown is a detailed view of the locking recess 26 and the locking tab 24, which is a peninsula-type cutout, forming a resilient appendage with teeth extending outwardly therefrom. The locking tab 24 retracts as the first post member 20 is inserted into the first receiver recess 18 and snaps into place once aligned with the locking recess 26 where it is retained due to the structure of the flat top thereby securing the desk top to the chair until the locking tab 24 is depressed simultaneously as the desktop 14 is lifted.

Figure 8:
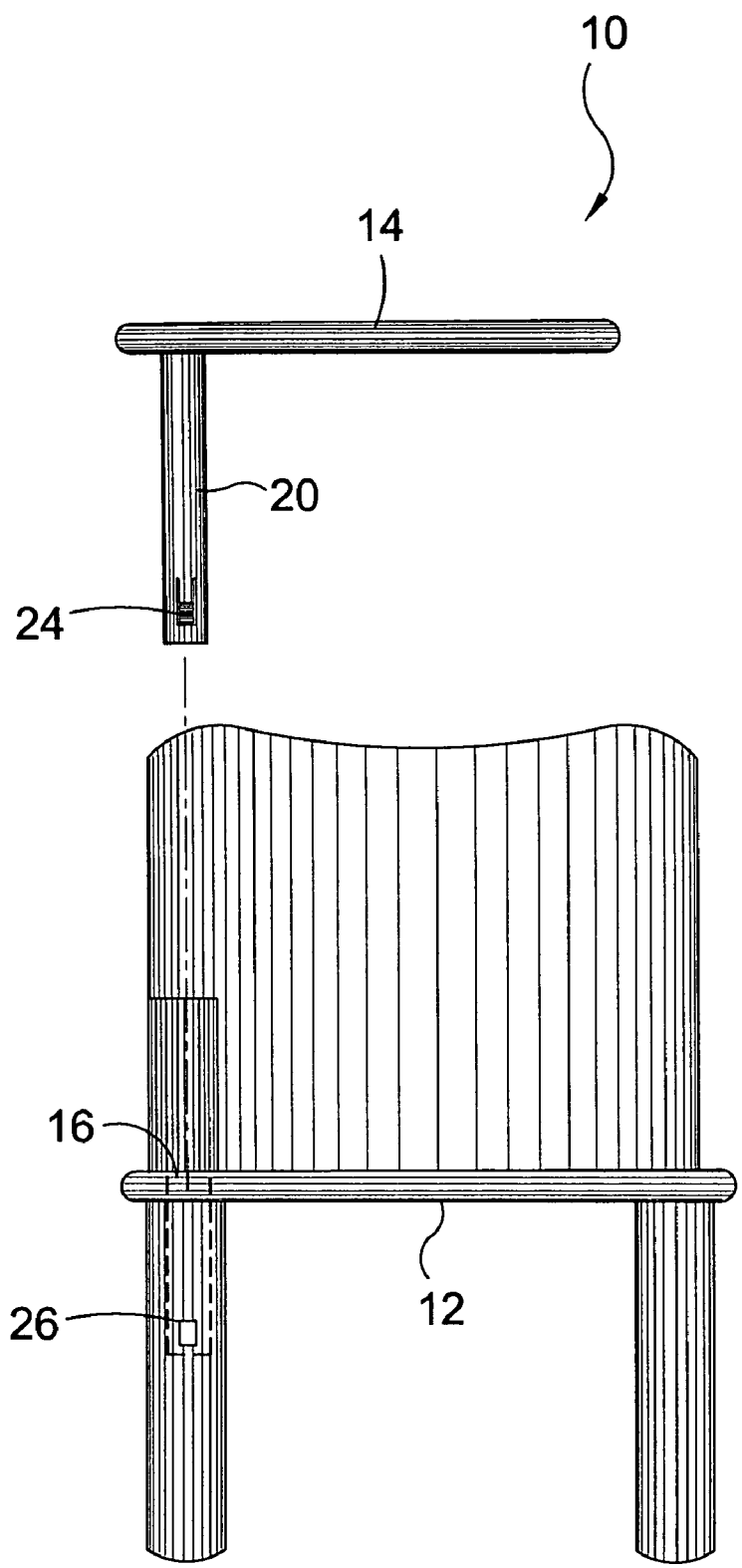
FIG. 8 is an exploded front view of the present invention.

FIG. 8 is an exploded front view of the present invention 10. Shown is a detailed view of the locking recess 26 and the locking tab 24, which is a peninsula-type cutout, forming a resilient appendage with teeth extending outwardly therefrom. The locking tab 24 retracts as the first post member 20 is inserted into the first receiver recess 18 and snaps into place once aligned with the locking recess 26 where it is retained due to the structure of the flat top thereby securing the desk top to the chair until the locking tab 24 is depressed simultaneously as the desktop 14 is lifted. The shape and configuration may be changed without deviating from the objectives and operation mentioned above.

Figure 9:
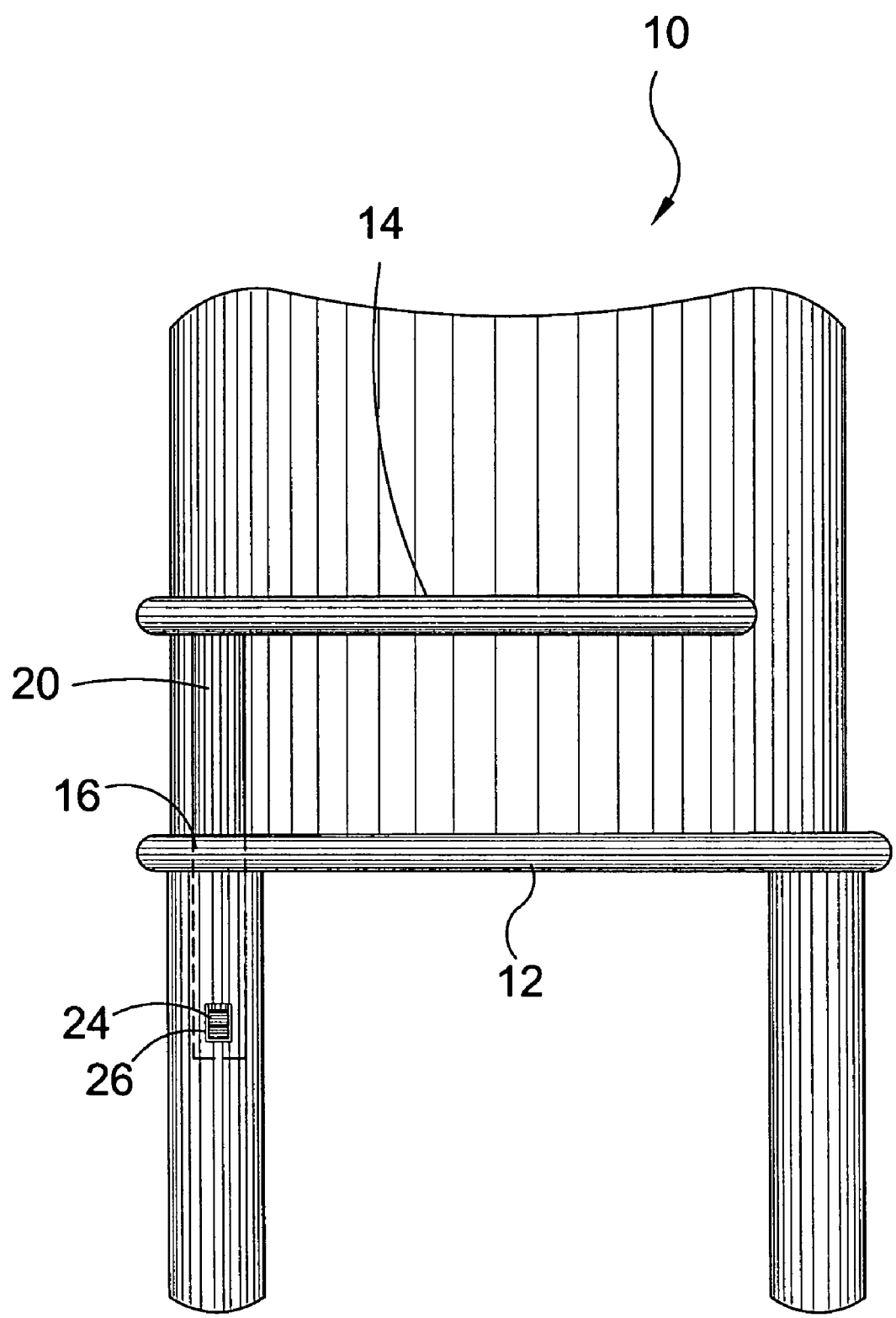
FIG. 9 is a front view of the present invention fully assembled.

FIG. 9 is a front view of the present invention fully assembled. Shown is the desktop 14 installed in the chair 12. The first post member 20 is shown inserted into the first receiving recess 16 with the locking tab 24 secured within the locking recess 26.

Figure 10:
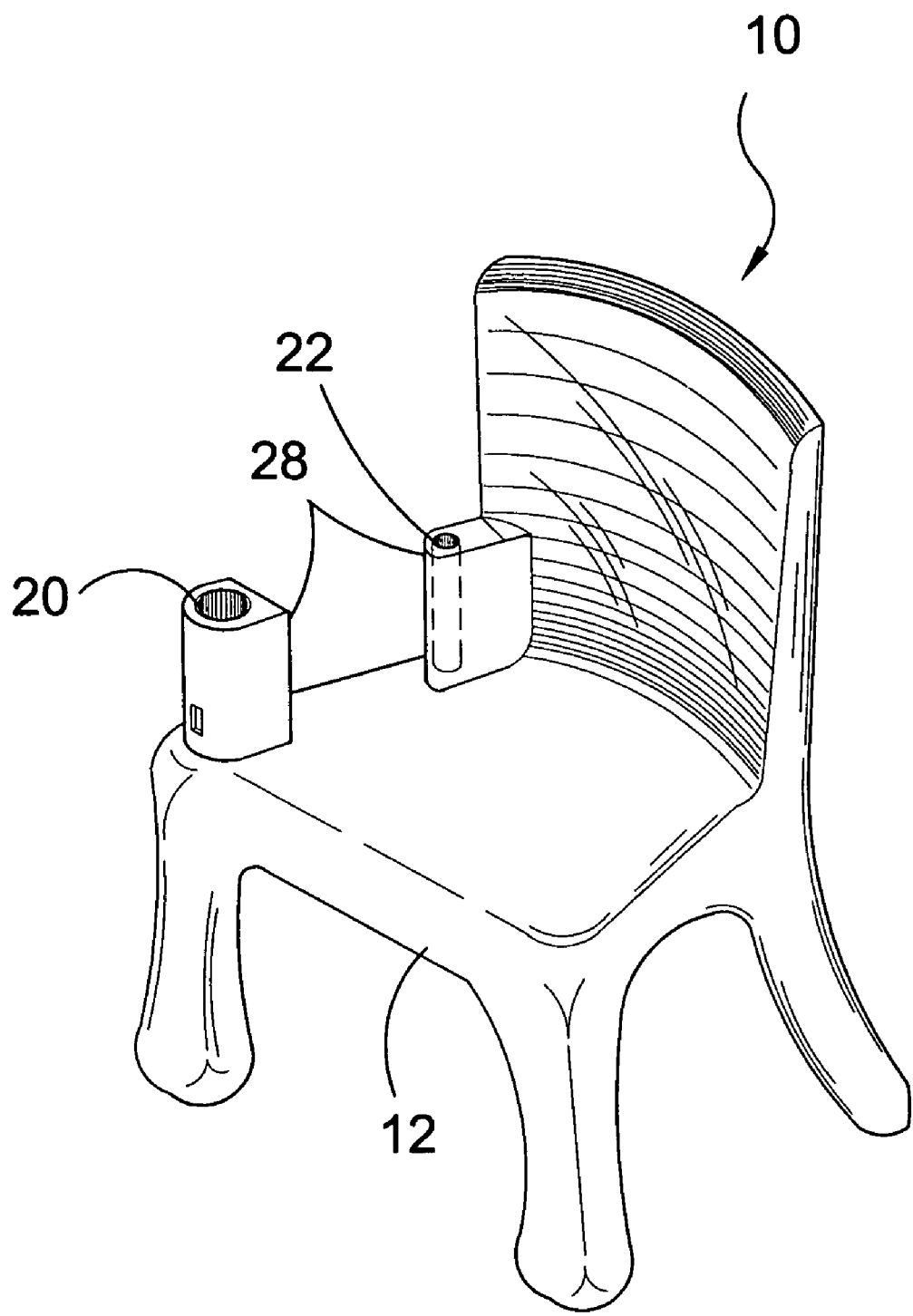
FIG. 10 is a perspective view of an alternate configuration of the present invention.

FIG. 10 is a perspective view of an alternate configuration of the present invention 10. Shown is a perspective view of the present invention 10 demonstrating that the configuration of the desk support 28 and the first receiver recess 16 may be modified, altered or changed without affecting the concept of the present invention 10.

Figure 11:
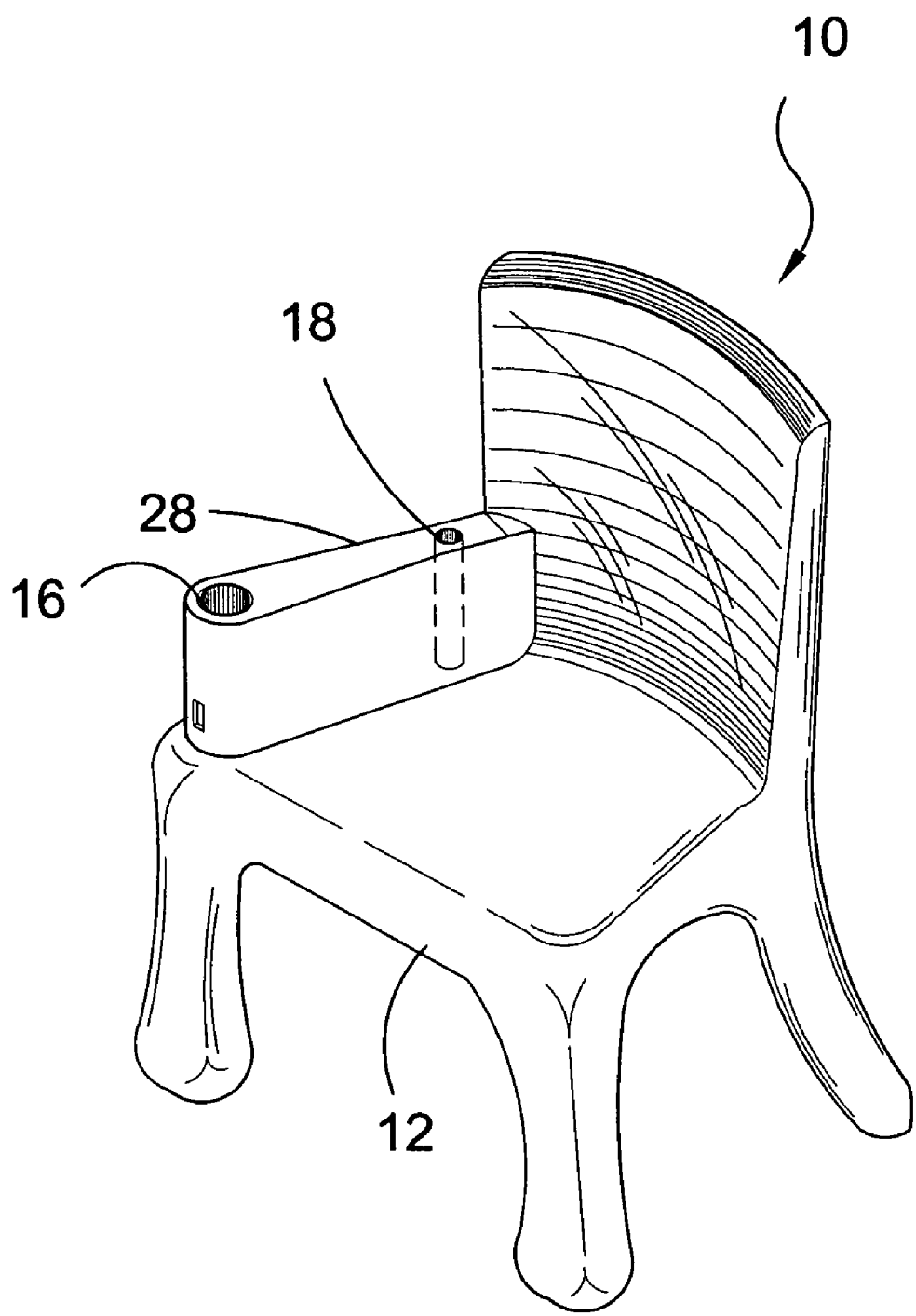
FIG. 11 is a perspective view of an alternate configuration of the present invention.

FIG. 11 is a perspective view of an alternate configuration of the present invention 10. Shown is a perspective view of the present invention 10 demonstrating that the configuration of the desk support 28 and the first receiver recess 16 may be modified, altered or changed without affecting the concept of the present invention 10.

Figure 12:
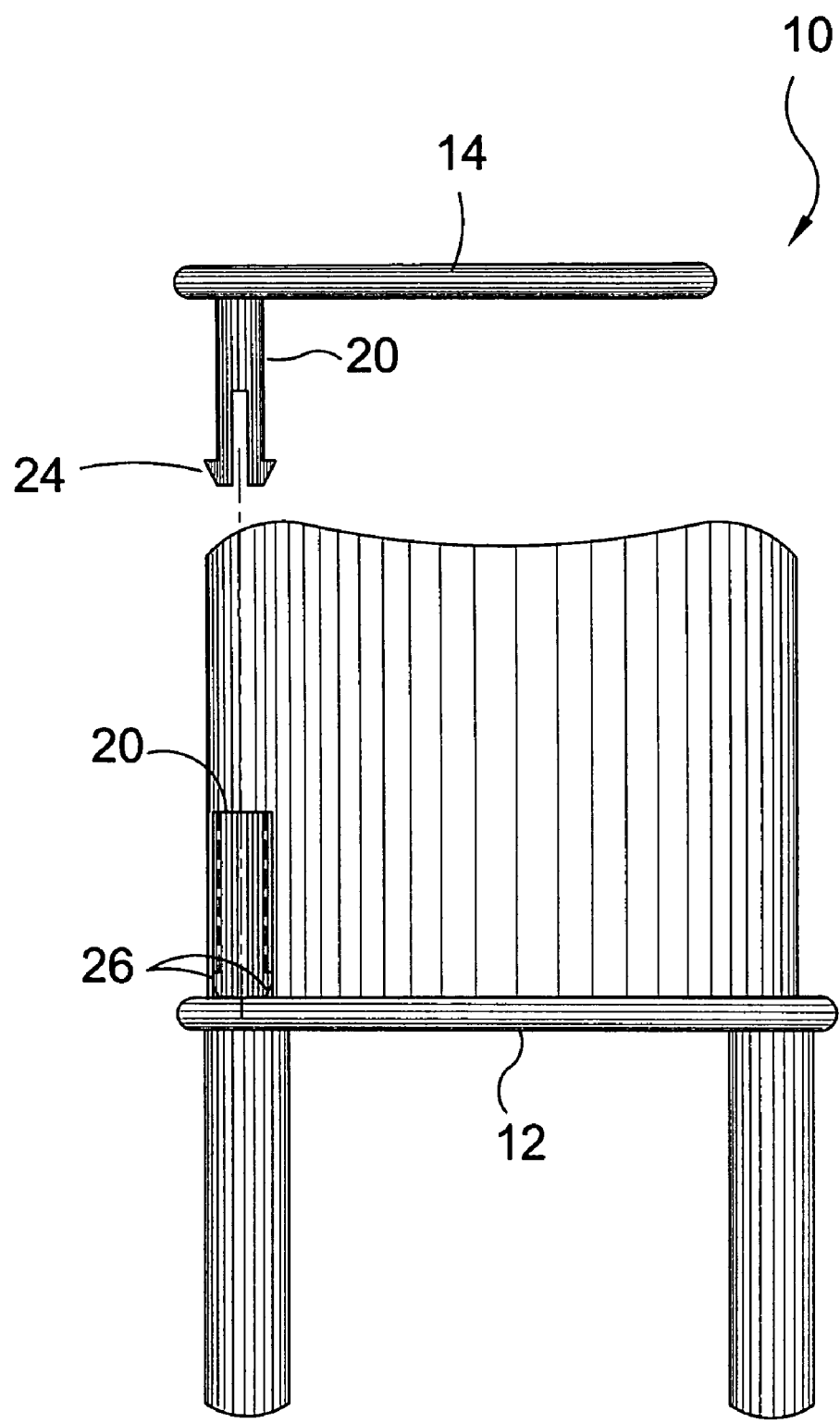
FIG. 12 is an exploded front view of an alternate locking means of the present invention.

FIG. 12 is a front view of the present invention 10 with an alternate locking means 23. Shown is a front view of the present invention 10 with an alternate locking means 23 for securing the tabletop to the chair. The first post member 20 has a pair of resilient bifurcated locking tabs 24 disposed on the distal end thereof. The first post member 20 is inserted into the first receiving recess 16 and the locking tabs 24 spring into the locking recesses 26 when aligned therewith to secure the desktop 14 to the chair 12. The desktop 14 may be released when the locking tabs 24 are simultaneously retracted into the locking recesses 26 and lifted therefrom.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A combination desk and chair comprising:
    a) a chair having a seat and a back, said seat having a first recess disposed towards a front of said seat for receiving a first vertically extending post member and a second recess disposed toward a rear of said seat adjacent said back for receiving a second vertically extending post member, both recesses being adjacent one side of said seat;
    b) a planar desktop having a top side and a bottom side;
    c) said first post member extending from said bottom side of said desktop and sized to correspond with said first receiving recess for insertion therein;
    d) said second post member extending from said bottom side of said desktop and sized to correspond with said second receiving recess for insertion therein, said desktop being supported only by said first and second post members;
    d) a quick-release locking means for releasably securing said first post member to said first receiving recess, said quick-release locking means located within a front leg of said chair.

2. A combination desk and chair as recited in claim 1, wherein said second receiving recess is disposed within a raised desk support extending from a top portion of said seat, said desk support having a rear wall flush against said back.

3. A combination desk and chair as recited in claim 2, wherein said bottom side of said desktop is seated upon the top of said desk support when installed.

4. A combination desk and chair as recited in claim 3, wherein said first post member extends fully into said first receiving recess when installed so the distal end of said first post member is seated on the bottom of said first receiving recess.

5. A combination desk and chair as recited in claim 4, wherein the length of said first post member and the depth of said first receiving recess are calculated to support the front of said desktop at a height substantially equivalent to the height of the rear of said desktop seated on said support post.

6. A combination desk and chair as recited in claim 5, wherein said locking means is a locking tab disposed on said first post member and mating locking recess extending through said leg of the chair thus allowing said locking tab to snap into said locking recess when said first post member is fully inserted therein thus securing said first post member therein until said locking tab is depressed through said leg by a user while simultaneously raising said desktop thus removing said desktop from said chair.

7. A combination desk and chair as recited in claim 1, wherein said desk and chair are fabricated of a resin polymer.

8. A combination desk and chair as recited in claim 1, wherein said quick-release locking means comprises a bifurcated distal end forming a pair of opposing resilient locking tabs that snap into corresponding locking recesses in said front leg.

* * * * *